Figure 7:
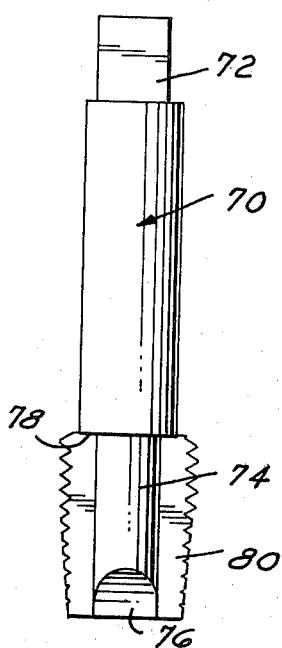

United States Patent [19]
Schott

[11] 4,316,683
[45] Feb. 23, 1982

[54] SEMI-CIRCULAR THREAD TAP

[75] Inventor: Lawrence A. Schott, Detroit, Mich.

[73] Assignee: Roger A. Schott, Redford, Mich. ; a part interest

[21] Appl. No.: 267,429

[22] Filed: May 26, 1981

Related U.S. Application Data

[63] Continuation-in-part of Ser. No. 69,289, Aug. 24, 1979, abandoned.

[51] Int. Cl.³ ............... B23B 51/00; B21K 21/00; B23G 5/06
[52] U.S. Cl. ............................. 408/219; 10/141 R; 76/101 B
[58] Field of Search ............... 408/144, 145, 219, 220, 408/221, 222, 223, 224, 225; 76/101 B; 10/141 R

[56] References Cited

U.S. PATENT DOCUMENTS

| 117,082 | 7/1871 | Kraus | 408/219 |
|---|---|---|---|
| 428,490 | 5/1890 | Hoerle, Jr. | 408/222 |
| 1,232,099 | 7/1917 | Schoenert | 408/222 |
| 1,908,575 | 5/1933 | Tucker | 408/220 |
| 2,033,557 | 3/1936 | Tucker | 408/222 |
| 2,684,492 | 7/1954 | Miner et al. | 408/219 |
| 3,336,614 | 8/1967 | Benjamin | 76/101 B |
| 4,090,808 | 5/1978 | Nannen | 408/222 |
| 4,123,194 | 10/1978 | Cave | 408/221 |

Primary Examiner—Harrison L. Hinson
Attorney, Agent, or Firm—Barnes, Kisselle, Raisch & Choate

[57] ABSTRACT

A tap for cutting threads in a hole which comprises a semi-circular tap body with threads cut in the circular surface extending to a diametrical surface. Modified embodiments include a rake angle at the cutting ends of the tap threads and a drill point to allow the device to serve as a drill and tap.

3 Claims, 12 Drawing Figures

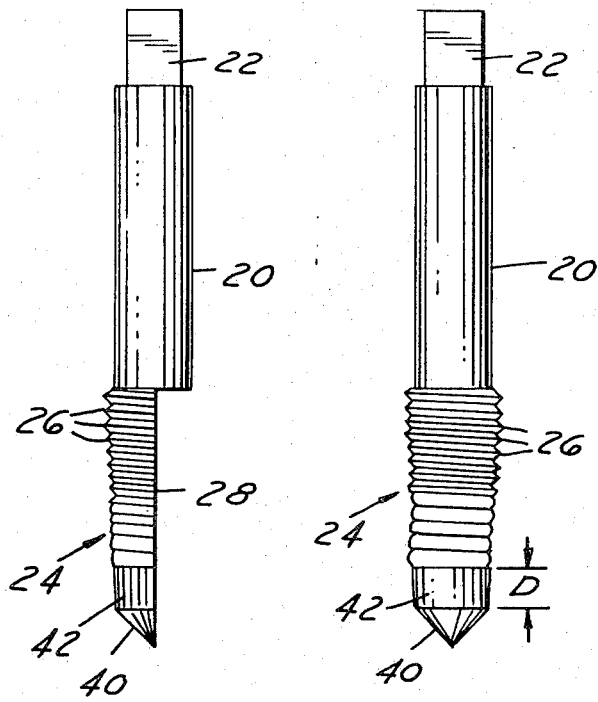

SEMI-CIRCULAR THREAD TAP

This application is a continuation-in-part of my co-pending application, Ser. No. 69,289, filed Aug. 24, 1979, entitled "Semi-Circular Thread Tap", now abandoned.

FIELD OF INVENTION

The cutting of threads in a hole by a tap or combination drill and tap.

BACKGROUND AND OBJECTS OF THE INVENTION

In the cutting of threads in a formed hole, a circular cylindrical tap has been used which usually has shallow threads at the end graduated into full threads as the threads progress upwardly in the tap body. The taps sometimes have axial slots in the threads to assist in the removal of chips cut by the threads on the tap. But chip removal has remained a problem and has resulted in a slowing of the tapping process and sometimes a jamming of the tap threads requiring a removal and reinsertion of the tap to clear the threads prior to finishing the hole.

It is an object of the present invention to provide a tap which can be used in a more rapid tapping action and one which will eliminate the chip problem by providing a chip removal structure adequate to eliminate any chip jamming which could cause defacing of the formed threads. It is a further object to provide a tap which can be utilized in a single pass even for relatively long holes. It is a further object to provide a tap which can be easily molded into its finished form.

Briefly, this is accomplished by providing a semi-circular tap body which, it has been found, will center itself perfectly in a hole and provide a clear channel for chips to fall clear of the tap and the hole.

DRAWINGS

Drawings accompany the disclosure, and the various views thereof may be briefly described as:

FIG. 1, a side view of the tap according to the present invention.

FIG. 2, a view of the tap on the arrow 2 of FIG. 1.

FIG. 3, an end view of the working end of the tap.

FIG. 4, a view of the drive end of the tap.

FIG. 5, an end view of a modified tap showing a rake angle on the leading corners of the tap threads.

FIG. 6, an end view of a modified version of a tap with a hollow semi-circular shell body.

FIG. 7, a front elevation of a two-piece modified thread tap.

Figure 8:
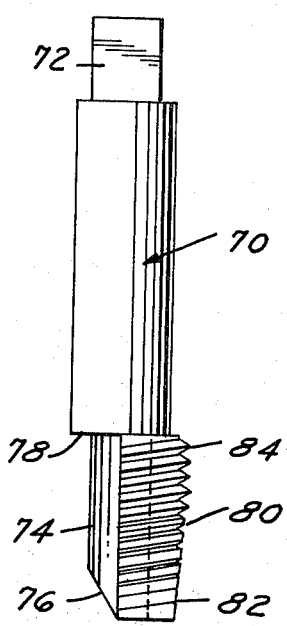

FIG. 8, a side view of the tap shown in FIG. 7.

Figure 9:
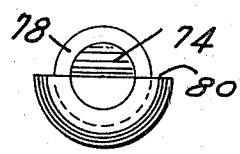

FIG. 9, an end view of the tap shown in FIG. 7.

Figure 10:
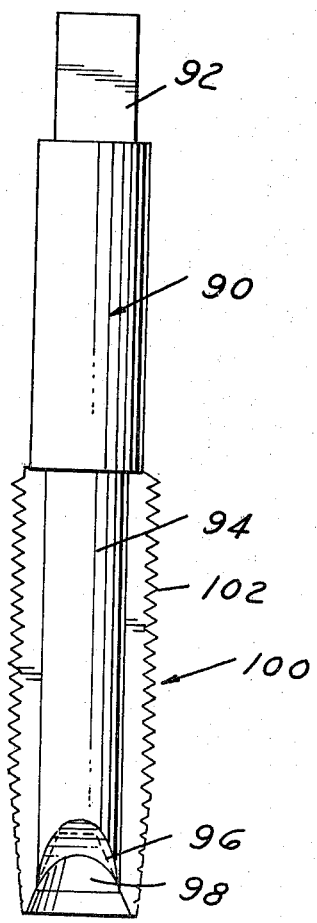

FIG. 10, a front elevation of another two-piece modification.

Figure 11:
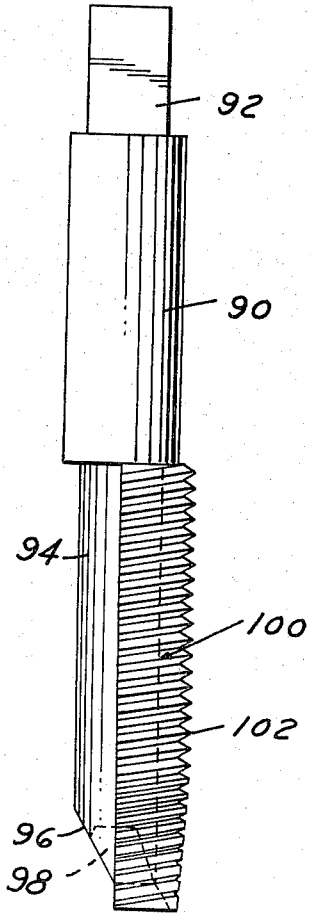

FIG. 11, a side view of the structure shown in FIG. 10.

Figure 12:
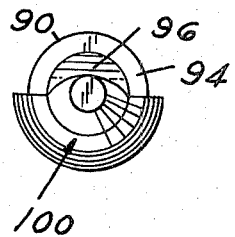

FIG. 12, an end view of the tap shown in FIG. 10.

DESCRIPTION OF THE INVENTION AND OF THE MANNER AND PROCESS OF USING IT

With reference to the drawings, in FIG. 1, a cylindrical shaft 20 has a square drive end 22. At the working end of the device is a semi-circular tap tool 24 with threads 26 formed on the circular outer surface. These threads extend to a chordal surface 28 at or near the axis of rotation of the device. The threads start as shallow spiral grooves with the designated pitch for a particular tap and graduate upwardly and outwardly to the full threads as is customary in tap design.

The tap is used in the same manner as previous taps and centers itself in a hole with no off-setting due to the full semi-circular body. The open side of the tap provides a large axial passage, when in a hole, for the clearance of chips resulting from the threading operation. The chip may fall clear of the tap and thus jamming is prevented.

As illustrated in FIGS. 1, 2 and 3, a drill point 40 can be formed in the working end of the tap body 24 so that the tap may be a self-drilling device and a so-called self-tapping device which drills and taps as it enters solid metal. A semi-circular point 40 will serve to enter the face of solid metal, that is, a point projection 40 which is essentially a half-cone. A cylindrical lead portion 42 has a dimension D which is preferably as long as the thickness of the metal being drilled.

The device above described is used in the same manner as any drill tap.

In FIG. 5, a working end 50 of a tap is shown on a drive body 52 and the transverse surface 54 of the tap differs from that shown in FIG. 3 in that, instead of being diametrically flat, it is concave to provide a rake angle at the cutting corners 56 to facilitate the cutting of the threads. The corners at the cutting threads fall essentially at the diameter of the device to insure proper centering.

In FIG. 6, a modified tap is illustrated in a shell form on a drive body 60. The shell 52 is semi-circular on the outer surface as in FIGS. 3 and 5. The inner surface is hollowed out to provide a semi-circular recess 54 so that the actual tap body has a relatively uniform radial thickness.

The taps are formed of a hard metal such as high speed steel, or carbide. The particular configuration of the described taps lends itself to being molded of powdered metal and thus provides a tap which is harder and can be rotated at much greater speeds. The configuration of FIG. 6 would result in a savings in material while being equally effective in operation and providing even more chip space in operation.

Another advantage of the tap lies in the shape, which, should there be breakage in a hole, permits a semi-circular tool to be inserted along side the tap so it can be readily turned out of the hole. While the term "semi-circular" is used, this can mean substantially semi-circular since the chordal flat might be slightly off-center of the axis of rotation and still function as desired.

Additional embodiments of the semi-circular tap are shown in FIGS. 7 to 12. In FIG. 7, a two-piece tap is illustrated wherein a cylindrical drive shank 70 has a square drive end 72 and at the other end a cylindrical ensmalled shank portion 74 with one side chamfered at 76. A shoulder 78 is formed between parts 70 and 74. This part 70 is made of a suitable steel.

A half-circle tap segment 80 is formed of a suitable tungsten carbide grade with an entrance end 82 of low profile threads increasing to the full thread shape at 84. This segment 80 has a half-circle inner recess which fits and is brazed on to the shank 74 with one end against the shoulder 78. The full diameter of the tap section is greater than the diameter of the drive section 70. Thus, the most expensive part of the tool can be a small element in comparison to the overall tool. The half-section plus the chamfer 76 allows chip room so the tap can bottom out in a blind hole. The mount shank is essentially coextensive longitudinally with the carbide segment.

In another embodiment in FIG. 10 a drive shank 90 has a square shank 92 and a shank mount section 94 terminating in a shoulder 95. This shank mount has a chamfered end 96 and a bottom recess 98 which provides a chip recess. The chamfers 76 and 96 can have an angle of about 30° to the axis of the tools.

Shank section 94 carries a half-circle tap section 100 essentially coextensive longitudinally therewith and having half threads 102, the thread crests being blunted at the lower end and rising to full crest as they progress from the entrance end. The section 100 has a half-circle inner recess to fit shank 94.

The taps of FIGS. 7 and 10 are not drill type taps but will function in a drilled hole. The tap section 100 is also formed of a suitable grade of tungsten carbide and brazed on to the mounting shank 94 against the shoulder 95.

In both embodiments of FIGS. 7 and 10, the steel mount shank reinforces the more brittle carbide throughout its length and this provides a better tool life.

In addition, the carbide tap sections can be removed and replaced when worn or broken.

We claim:

1. In a tap for threading holes in metal:
   (a) a cylindrical drive section of steel having an ensmalled mount shank at a working end, the drive section and the mount shank having a radial shoulder therebetween, and
   (b) a half-circle tap segment having a half-circle recess on one side to fit the mount shank and a half-circle threaded surface on the other side to form a tap surface, said tap section having a length extending substantially the length of the ensmalled mount shank, said tap segment being brazed on said mount shank with one end against said shoulder.

2. A tap as defined in claim 1 in which said mount shank is chamfered at one end to provide chip space in a blind hole.

3. A tap as defined in claim 1 in which said mount shank is chamfered and recessed at one end to provide chip space in a blind hole.

* * * * *